(12) United States Patent  
Fujita et al.

(10) Patent No.: US 6,737,771 B2  
(45) Date of Patent: May 18, 2004

(54) TORQUE STABILIZER FOR BRUSHLESS SERVO MOTOR

(75) Inventors: Youichi Fujita, Tokyo (JP); Satoshi Kawamura, Tokyo (JP); Sotsuo Miyoshi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/416,888

(22) PCT Filed: Sep. 17, 2001

(86) PCT No.: PCT/JP01/08066  
§ 371 (c)(1),  
(2), (4) Date: May 16, 2003

(87) PCT Pub. No.: WO03/026124  
PCT Pub. Date: Mar. 27, 2003

(65) Prior Publication Data  
US 2004/0036429 A1 Feb. 26, 2004

(51) Int. Cl.⁷ .................................................. H02K 7/00
(52) U.S. Cl. ...................... 310/68 B; 310/68 R; 318/254
(58) Field of Search ................ 310/68 B, 67 R, 310/68 R, 51; 318/254

(56) References Cited

U.S. PATENT DOCUMENTS

| | | | | | |
|---|---|---|---|---|---|
| 3,876,919 | A | * | 4/1975 | Kearns | 388/819 |
| 4,025,808 | A | * | 5/1977 | Grengg et al. | 310/68 B |
| 5,086,243 | A | * | 2/1992 | Hofmann | 310/68 B |
| 5,517,067 | A | * | 5/1996 | Sata | 310/68 B |
| 6,153,993 | A | * | 11/2000 | Oomura et al. | 318/434 |
| 6,664,698 | B1 | * | 12/2003 | Tasch et al. | 310/239 |

FOREIGN PATENT DOCUMENTS

JP 64-064583 3/1989

* cited by examiner

Primary Examiner—Thanh Lam  
(74) Attorney, Agent, or Firm—Sughrue Mion, PLLC

(57) ABSTRACT

When it is judged that a driven body reaches vicinity of a target position, a present phase of the passing current is not switched to keep a state of the passing current even if a phase of a passing current needs to be switched judging from the position of permanent magnet rotor thereby a stabilizing of torque can be attained.

3 Claims, 5 Drawing Sheets

TORQUE STABILIZER FOR BRUSHLESS SERVO MOTOR

TECHNICAL FIELD

The present invention relates to a device for stabilizing torque of a brushless servo motor used as a driving source such as a throttle valve, an actuator, an exhaust gas recirculation (hereinafter referred to as EGR) valve and the like.

BACKGROUND ART

FIG. 1 is an explanatory diagram in which a valve 11 of the EGR valve arranged in an exhaust gas return passage (c) for making an exhaust gas passage (a) of an engine E communicate with an intake gas passage (b) thereof is an object to be controlled and in which a brushless servo motor 21 is driven by an output of a control section 100 to control an opening of the valve 11.

FIG. 2 is a longitudinal cross sectional view to show a constitution of the EGR valve having the brushless servo motor 21 as a driving source to which a servo control device is applied. In FIG. 2, a reference numeral 1 denotes a valve body in which a passage communicating with the exhaust gas return passage (c) disposed in a recirculation system of an exhaust gas is formed. When the valve 11 is moved up as shown in the drawing, it is put into contact with a seat 12 to thereby close the exhaust gas return passage (c) and when the valve 11 is moved down, it is separated from the seat 12 to thereby open the exhaust gas return passage (c).

A reference numeral 21 denotes a brushless servo motor to be a driving means (torque generating source) of a valve for opening/closing the exhaust gas passage, 22 denotes a motor case mounted on the valve body 1, 23 denotes a rotor rotatably supported in the motor case 22 via bearings 24, 25, and the rotor 23 has a screw hole 23a which is made through a central portion of a shaft. A reference numeral 26 denotes a magnet mounted on an outer peripheral portion of the rotor 3, 27 denotes a stator core surrounding an outer periphery of the magnet 26, and between this stator core 27 and the above mentioned magnet 26 is formed a predetermined gap.

A reference numeral 28 denotes a coil that is arranged on the stator core 27 and it constitutes a stator, 29 denotes a motor shaft to be a valve driving shaft, and this motor shaft 29 is made as a screw shaft and screwed into the screw hole 23a of the above mentioned rotor 23 and made to move in an axial direction by a rotation of the above mentioned rotor 23.

A reference numeral 30 denotes a valve shaft abutting member integrally formed with the motor shaft 29. By making a top end of a valve shaft 13 having the above mentioned valve 11 at its top end abut against the tip (bottom end in FIG. 1) of this valve shaft abutting member 30, the valve shaft 13 is made to follow a movement in the axial direction of the above mentioned motor shaft 29 to thereby open/close the above mentioned valve 11.

A reference numeral 31 denotes a covering member mounted on an end surface of the valve shaft abutting member 30 side in the motor case 22, 32 denotes a spring retaining member mounted on a tip side of the valve shaft abutting member 30, 33 denotes a spring for urging the valve, which is hung between the spring retaining member 32 and the above mentioned covering member 31, and this spring 33 urges the valve 11 at the tip of the valve shaft 13 via the valve shaft abutting member 30 in a direction that opens the valve 11. A reference numeral 14 denotes a spring receiver mounted on the top end of the valve shaft 13 and between the spring receiver 14 and the valve body 1 is provided a return spring 18.

A reference numeral 35 denotes a power source side case mounted on an opening end portion of the motor case 22. This power source side case 35 is an integrally molded part made of synthetic resin and constitutes a main device body for passing a current through the brushless servo motor 21 and is an integral combination of a board 37 for mounting hall devices 36 and an input/output connector part 38 having a connector terminal 38a. A reference numeral 39 denotes a magnet that is mounted on an end of the rotor so as to move opposite to the hall device 36.

FIG. 3 is a control circuit diagram of the brushless servo motor 21 in the prior art. The control circuit has hall devices 36U, 36V, 36W for detecting a position of the rotor 23, a switching unit 40 that includes a group of transistors for receiving the signals of these hall devices and switching the passing of a current through coils 28U, 28V, 28W, and passes the current through the coils 28U, 28V, 28W sequentially to thereby rotate the rotor 23 in a given direction.

The above mentioned switching unit 40 has switching devices (hereinafter referred to as switch devices) 41U, 41V, 41W that receive output signals of the hall devices 36U, 36V, 36W to be brought into conduction; an interrupting section 42 that receives output signals of the switch devices 41U, 41V, 41W to output an interrupting signal; a signal processing block 43 that receives and processes output signals of the above mentioned hall devices 36U, 36V, 36W based on the output signal of the interrupting section 42; switch devices 44 to 49 that receive the output signals of the signal processing block 43 to be brought into conduction; and pairs of switch devices 50 and 51, 52 and 53, 54 and 55 each pair of which are connected in series to each other, have one end of one of coils 28U, 28V, 28W connected to their connection midpoint, and change a state of conduction based on the output signal of the switch devices 44 to 49.

The above mentioned signal processing block 43 has a digital input port 61 for receiving the output signals of the hall devices 36U, 36V, 36W; a counter 62 for reading in an output of the digital input port 61; a PI control computing section 64 for performing a PI control computation based on an output signal of the counter 62 and an output signal of a target value determining section 63; an excitation duty computing section for performing an excitation duty computation based on an output signal of the PI control computing section 64; an excitation phase computing section 66 for computing an excitation phase based on an output signal of the excitation duty computing section 65 and an output signal of the digital input port 61; a digital output port 67 for outputting an ON signal based on an output signal of the excitation phase computing section 66; and a PWM output port 68 for outputting a PWM signal based on an output signal of the excitation phase computing section 66 and an output signal of the excitation duty computing section 65.

Next, an operation will be described.

The target value determining section 63 determines a target value. When the output signal of the hall devices 36U, 36V, 36W detecting the position of the rotor 23 brings any one of the switch devices 41U, 41V, 41W into conduction, an output signal of the interrupting section 42 receiving the conduction signal makes the digital input port 61 and the counter 62 start receiving an input signal.

The PI control computing section 64 performs the PI control computation based on a present value inputted via the counter 62 and a target value from the target value determining section 63, and the excitation duty computing section 65 performs an excitation duty computation based on a result of the PI control computation and outputs a result of the excitation duty computation to the excitation phase computing section 66 and the PWM output port 68.

The excitation phase computing section 66 performs the excitation phase computation based on the given result of the excitation duty computation and the input signal received via the digital input port 61, and outputs a result of the excitation phase computation to the digital output port 67 and the PWM output port 68.

The digital output port 67 outputs an ON signal, for example, to a terminal U based on the output signal of the excitation phase computing section 66 to bring the switch device 50 into conduction via the switch device 44 to thereby connect a (+) terminal of the brushless servo motor 21 to a power applying terminal V. On the other hand, the PWM output port 51 outputs an output signal, for example, to a terminal W based on the output signals of the excitation duty computing section 65 and the excitation phase computing section 66 to bring the switch device 55 into conduction via the switch device 49 to thereby pass a current in a direction shown by an arrow through the brushless servo motor 21.

In this manner, the brushless servo motor 21 is operated to move down the motor shaft 29 by a rotation of its rotor 23 to move the valve shaft 13 in the same direction against the return spring 18 by this down movement, thereby moving the control valve 11 to a target position to open the control valve 11. Then, the hall devices 36U, 36V, 36W detect the position of the rotating rotor 23 sequentially and switch a passing of the current through the coils 28U, 28V, 28W to rotate the rotor 23 in the same direction. Then, power required to hold the control valve 11 at the position against a restoring force of the return spring 18 is supplied to the brushless servo motor 21 when the control valve 11 moves near to the target position and a difference between the present position and the target value becomes nearly equal to zero.

As described above, the EGR valve is given a predetermined return torque in the direction that closes the control valve 11 by the return spring 18 as an urging means and is given a variable motor torque in the direction that opens the control valve 11 by a rotational torque of the brushless servo motor 21 in a direction against a return torque, thereby holding a state of an expected opening by a balance between these torque.

In this arrangement there may be a case where though the coils 28U, 28V, 28W are mounted at 120 degree intervals on the motor, the hall devices 36U, 36V, 36W for detecting the rotational position of the rotor 23 are not mounted at 120 degree intervals because of a deviation caused by a flow of mounting solder or the like. FIG. 4 shows torque curves in the respective exciting states when the same current flows in U to V and U to W, and in a case where a current flowing from of the coil U to the coil V is changed to a current flowing from the coil U to the coil W, when the current is changed at a point t1, a continuous torque can be produced, but when the current is changed at a delayed point t2, the torque is greatly varied. As a result a movement of the control valve 11 which moves in proportion to time, is made greatly varied near a "point a" as shown in FIG. 4(b).

Because the brushless servo motor in the prior art is constituted in the manner described above, when this brushless servo motor is used as a driving source of the EGR valve, in a case where the control valve is held at a predetermined opening position by the torque balance between the return torque and the driving torque of the brushless servo motor 21, there is presented a problem that the torque balance is made unstable by a deviation in detecting the position of the rotor by the hall devices and a condition of load applied to the rotor.

The present invention has been made to solve the above mentioned problem, and an object of the present invention is to stabilize torque at a predetermined opening (middle holding) position in a brushless servo motor.

DISCLOSURE OF THE INVENTION

A torque stabilizing device of a brushless servo motor in accordance with the present invention includes: a brushless servo motor for driving a driven body; a hall device of each phase for detecting a position of permanent magnet rotor of the brushless servo motor; a switching unit that receives a detection signal of the hall device to switch the passing of a current through a coil of each phase; a PI control computing section for performing a PI computation based on a detection value of the hall device and a predetermined target value; and an excitation duty computing section for outputting a power source control signal for the brushless servo motor based on an output signal of the PI control computing section, characterized by that a load direction detecting section that detects the driven body moving near to a target position and outputs a signal for stopping switching phase of a current passing through the brushless servo motor to stop switching the phase of the current.

By this arrangement it is made possible to stabilize torque at a predetermined position and to hold the control valve stably at a target opening position even if a torque balance is made unstable by a deviation in detecting the position of the rotor by the hall device or a state of load applied to the rotor.

The load direction detecting section of the torque stabilizing device of a brushless servo motor in accordance with the present invention detects the driven body moving near to the target position by an inversion of polarity of the output signal of the PI control computing section.

By this arrangement it is made possible to surely check that the control valve is near the predetermined opening position and to switch current passing through a coil without fail and thus to hold the control valve at a target opening position stably.

The load direction detecting section of the torque stabilizing device of a brushless servo motor in accordance with the present invention holds a phase of a current passing in a direction that the driven body is pushed by a load.

By this arrangement it is made possible that the rotational force of the motor against a return torque in vicinity of the predetermined opening position to thereby hold the control valve at the target opening position.

BEST MODE FOR CARRYING OUT THE INVENTION

In order to describe the invention in more detail, a best mode for carrying out the invention will be described based on the accompanied drawings.

EMBODIMENT 1

Figure 1:
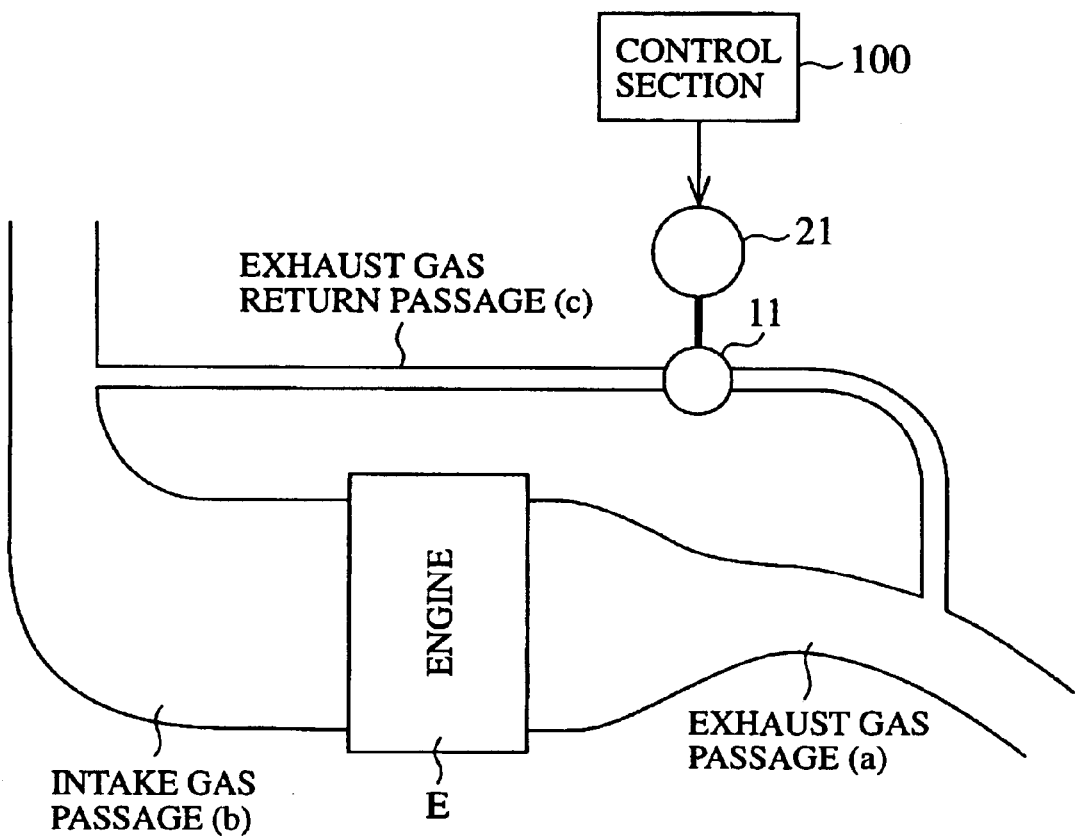
FIG. 1 is a schematic explanatory diagram of an engine exhaust system.
Figure 2:
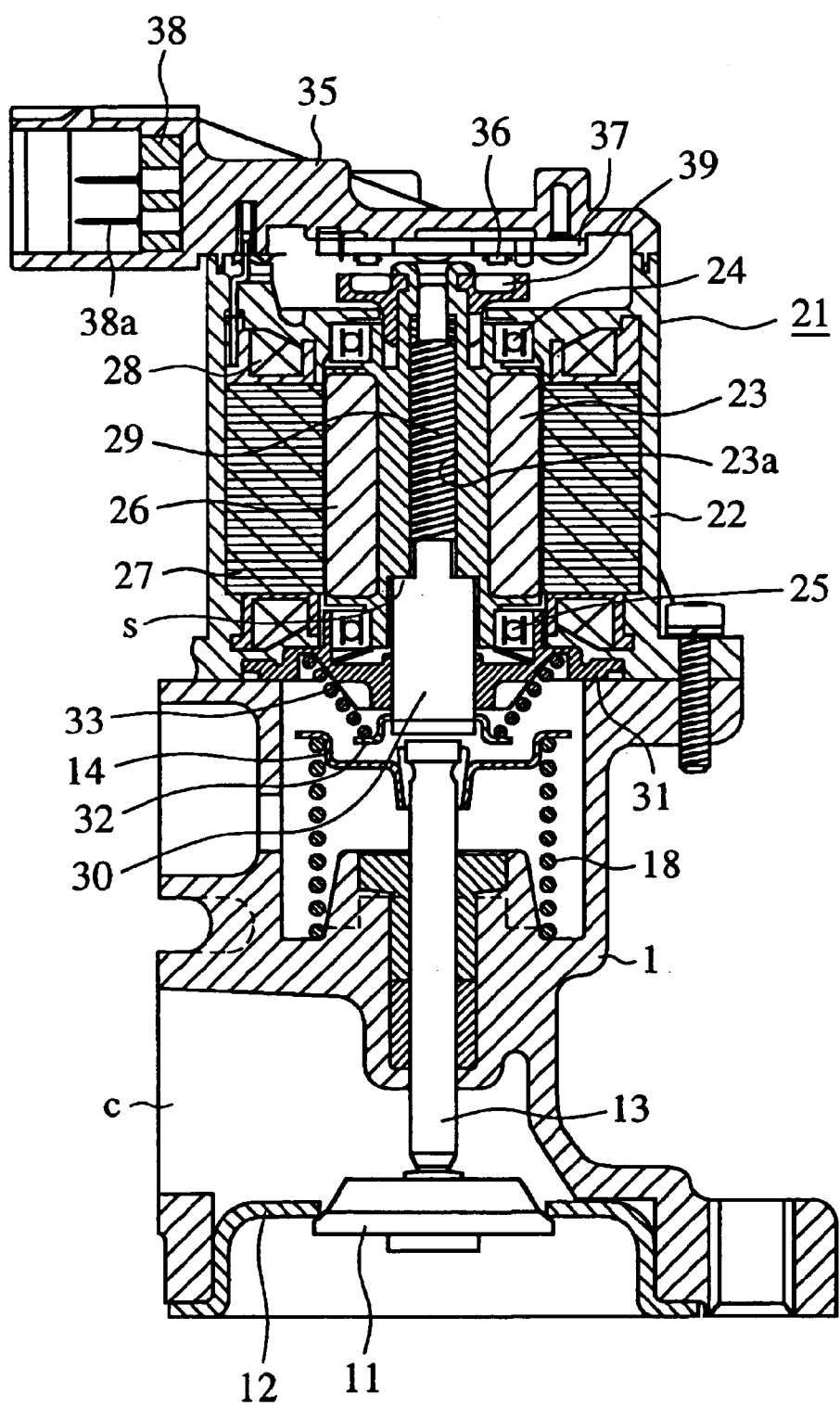
FIG. 2 is a longitudinal cross sectional view to show a constitution of an EGR valve.
Figure 3:
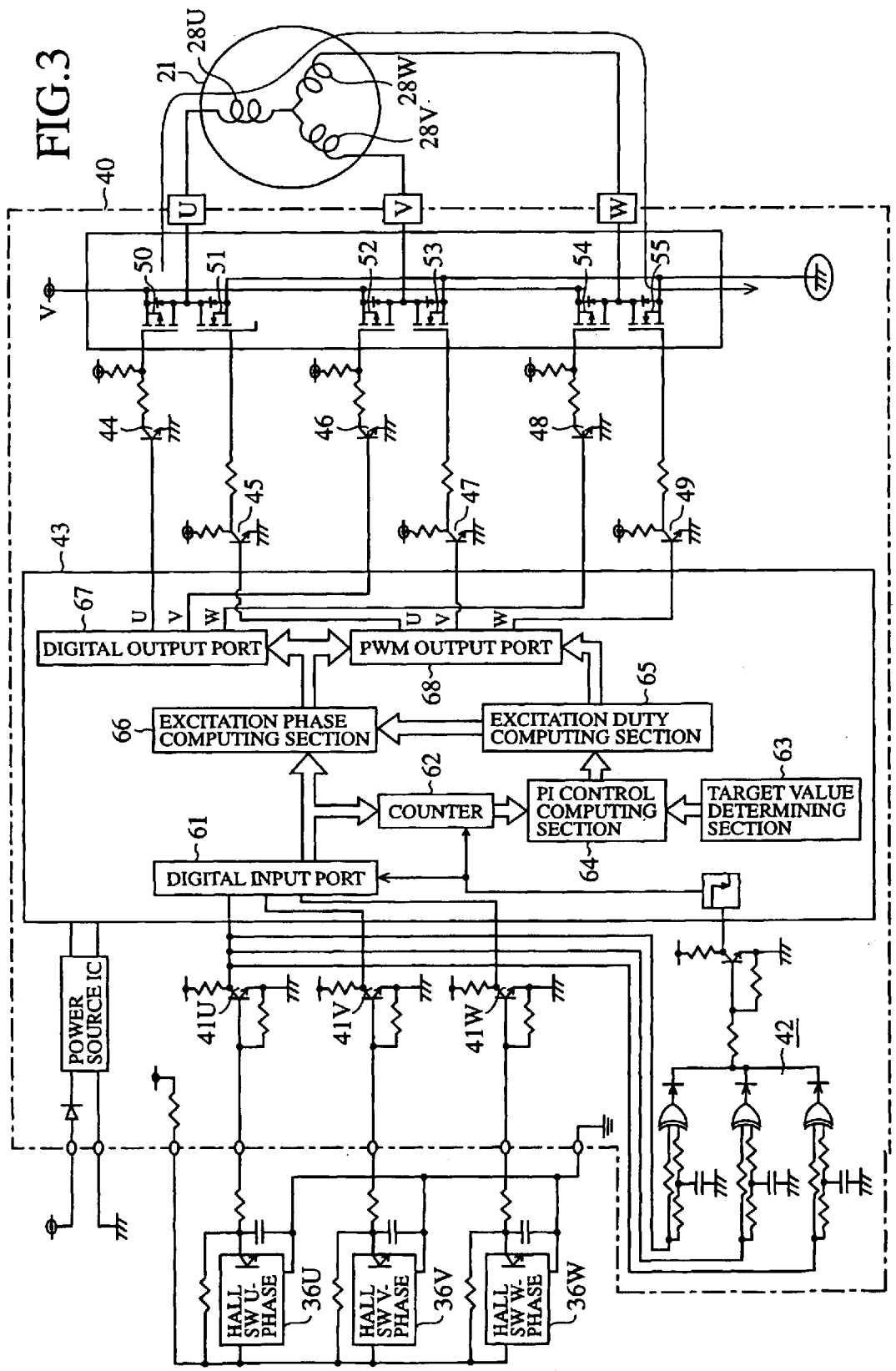
FIG. 3 is a control circuit diagram of a brushless servo motor in the prior art.
Figure 4:
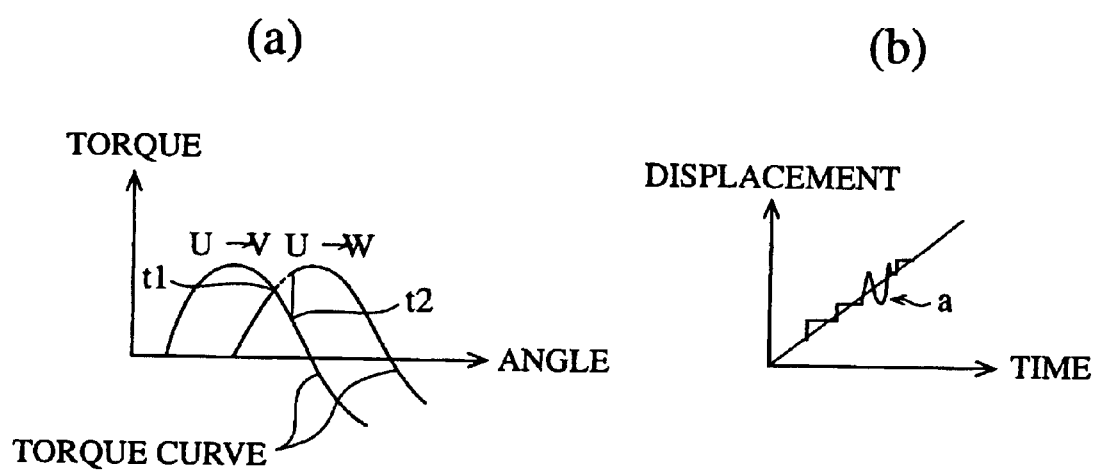
FIG. 4 shows a waveform of a current passing through a brushless servo motor.
Figure 5:
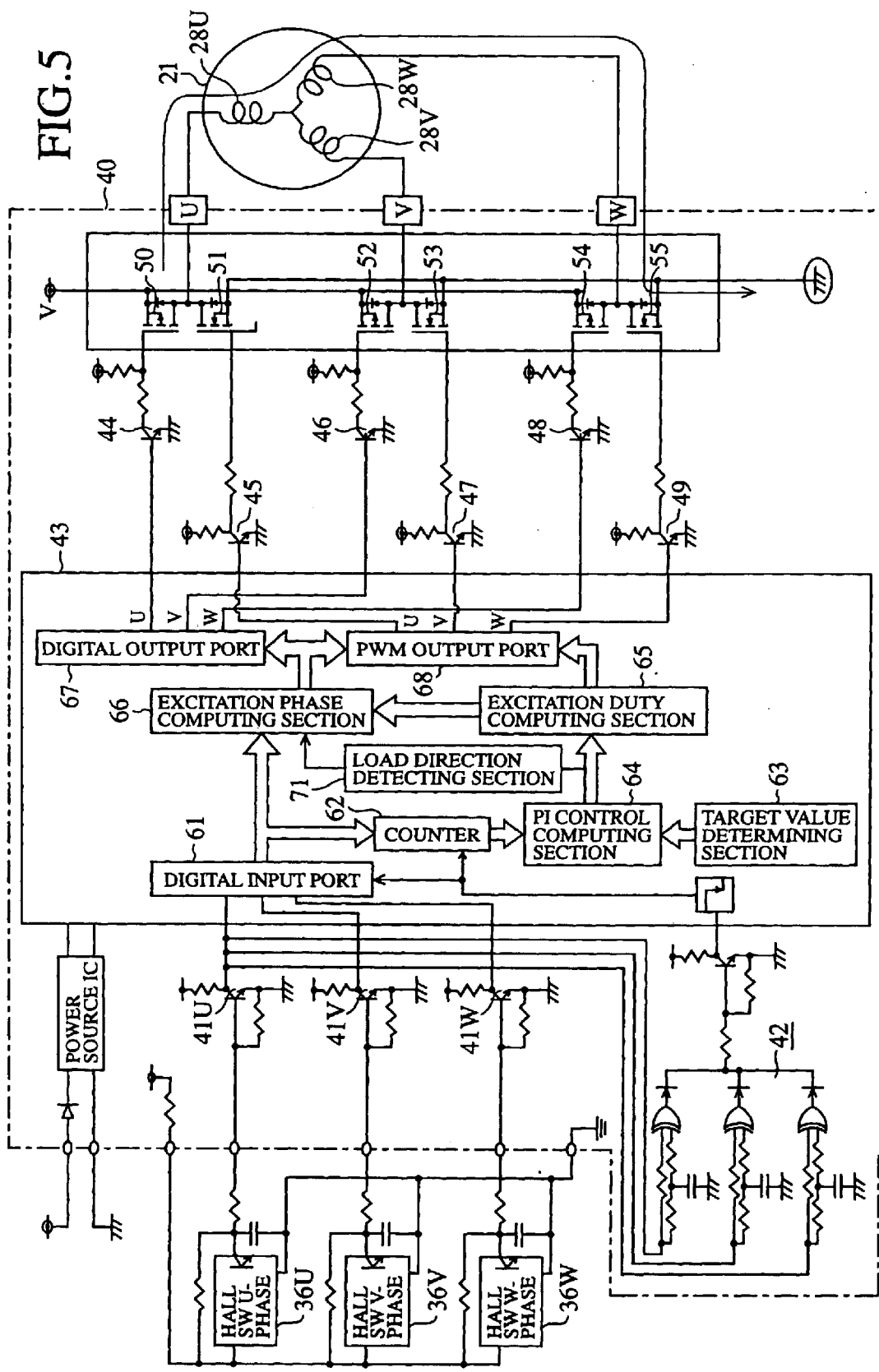
FIG. 5 is a control circuit diagram of a brushless servo motor in accordance with embodiment 1.

FIG. 5 is a control circuit diagram of a brushless servo motor 21 in accordance with embodiment 1. A reference numeral 71 denotes a load direction detecting section for checking whether a control valve 11 is in the vicinity of a predetermined opening position. Because a result of the PI control computation by a PI control computing section 64 remains "+" when the control valve 11 is within a predetermined opening position but changes to "−" when the control valve 11 exceeds the predetermined opening position, it can be made sure that the valve is in the vicinity of the predetermined opening position by means that the load direction detecting section 71 detects a point where the result of the PI control computation changes from "+" to "−". At this point the other constitution of this embodiment is quite the same as those of the prior art shown in FIG. 3 described above, so the same parts are denoted by the same reference symbols and their further descriptions will be omitted.

Next, an operation will be described.

The target value determining section 63 determines a target value. The output signal of hall devices 36U, 36V, 36W which detect the position of the rotor 23, brings any one of switch devices 41U, 41V, 41W into conduction and an output signal of the interrupting section 42 receiving a signal of conduction makes the digital input port 61 and the counter 62 start receiving an input signal.

The PI control computing section 64 performs the PI control computation based on a present value received via the counter 62 and the target value from the target value determining section 63 and the excitation duty computing section 65 performs an excitation duty computation based on the computation result and outputs its computation result to the excitation phase computing section 66 and the PWM output port 68.

The excitation phase computing section 66 performs an excitation computation based on the given result of the excitation duty computation and an input signal received via the digital input port 61, and outputs its computation result to the digital output port 67 and the PWM output port 68.

The digital output port 67 outputs an ON signal, for example, to the terminal U based on an output signal of the excitation phase computing section 66 to bring the switch device 50 into conduction via the switch device 44 to thereby connect the (+) terminal of the brushless servo motor 21 to the power applying terminal V. On the other hand, the PWM output port 68 outputs an output signal, for example, to the terminal W based on the output signals of the excitation duty computing section 65 and the excitation phase computing section 66 to bring the switch device 55 into conduction via the switch device 49 to thereby pass a current in a direction shown by an arrow through the brushless servo motor 21.

In this manner, the brushless servo motor 21 is operated to move down the motor shaft 29 by the rotation of its rotor 23 to move the valve shaft 13 in the same direction against the return spring 18 by this down movement, thereby moving the control valve 11 to the target position to open the control valve 11. Then, the hall devices 36U, 36V, 36W detect the position of the rotating rotor 23 sequentially and switch the passing of the current through coils 28U, 28V, 28W to rotate the rotor 23 in the same direction, thereby moving the control valve 11 to the vicinity of the target position. Then, when the control valve 11 is pushed in the vicinity of the target position by the load detected by the load direction detecting section 71 based on the computation value of the PI control computing section 64, a current is passed through the coil phase producing a torque curve increasing torque. As a result, stabilizing of the torque can be attained.

What is claimed is:

1. A torque stabilizing device of a brushless servo motor comprising:
    a brushless servo motor for driving a driven body;
    a hall device of each phase for detecting a position of permanent magnet rotor of the brushless servo motor;
    a switching unit that receives a detection signal of the hall device to switch the passing of a current through a coil of each phase;
    a PI control computing section for performing a PI computation based on a detection value of said hall device and a predetermined target value; and
    an excitation duty computing section for outputting a power source control signal for said brushless servo motor based on an output signal of the PI control computing section, characterized by that
    a load direction detecting section that detects said driven body moving near to a target position and outputs a signal for stopping switching phase of a current passing through said brushless servo motor to stop switching the phase of the current.

2. The torque stabilizing device of a brushless servo motor according to claim 1, characterized by that the load direction detecting section detects the driven body moving near to the target position by an inversion of polarity of the output signal of the PI control computing section.

3. The torque stabilizing device of a brushless servo motor according to claim 1, characterized by that the load direction detecting section holds a phase of a current passing in a direction that the driven body is pushed by a load.

* * * * *

UNITED STATES PATENT AND TRADEMARK OFFICE
CERTIFICATE OF CORRECTION

PATENT NO.     : 6,737,771 B2
DATED          : May 18, 2004
INVENTOR(S)    : Youichi Fujita, Satoshi Kawamura and Satoshi Miyoshi It is certified that error appears in the above-identified patent and that said Letters Patent is hereby corrected as shown below:

<u>Title page,</u>
Item [54], Title, please delete "TORQUE STABILIZER FOR BRUSHLESS SERVO MOTOR" and insert -- DEVICE FOR STABILIZING TORQUE OF BRUSHLESS SERVO MOTOR --

Signed and Sealed this

Nineteenth Day of April, 2005

JON W. DUDAS
*Director of the United States Patent and Trademark Office*